(12) United States Patent
Zotov et al.

(10) Patent No.: US 12,443,886 B1
(45) Date of Patent: Oct. 14, 2025

(54) TECHNIQUES FOR ADJUSTING MIXED REALITY GRAPHICAL ENVIRONMENTS USING MACHINE LEARNING

(71) Applicant: NEUREALITIES, INC., Las Vegas, NV (US)

(72) Inventors: Michael Zotov, London (GB); Ivelize Rocha Bernardo, Manchester (GB); Alexander Obenauff, Uppermill (GB)

(73) Assignee: NeuRealities, Inc., Las Vegas, NV (US)

( * ) Notice: Subject to any disclaimer, the term of this patent is extended or adjusted under 35 U.S.C. 154(b) by 0 days.

(21) Appl. No.: 18/635,372

(22) Filed: Apr. 15, 2024

(51) Int. Cl.
*G06N 20/00* (2019.01)
*G06F 3/01* (2006.01)
*G06T 11/00* (2006.01)

(52) U.S. Cl.
CPC ............. *G06N 20/00* (2019.01); *G06F 3/013* (2013.01); *G06T 11/00* (2013.01)

(58) Field of Classification Search
CPC .......... G06N 20/00; G06F 3/013; G06T 11/00
See application file for complete search history.

(56) References Cited

U.S. PATENT DOCUMENTS

| 10,664,953 | B1* | 5/2020 | Lanman | G06N 3/08 |
| 10,678,855 | B2* | 6/2020 | Vaughn | G06N 20/00 |
| 10,984,899 | B2* | 4/2021 | Vaughan | A61B 5/7267 |
| 11,039,742 | B1* | 6/2021 | Abou Shousha | G06N 3/084 |
| 11,435,820 | B1* | 9/2022 | Hirsh | G06F 3/0346 |
| 11,451,758 | B1* | 9/2022 | Chaurasia | H04N 13/344 |
| 11,587,210 | B1* | 2/2023 | Chen | G06T 3/047 |
| 12,205,725 | B2* | 1/2025 | Vaughan | G16H 50/20 |
| 2014/0180978 | A1* | 6/2014 | Martinez | G06N 3/045 706/12 |
| 2018/0114098 | A1* | 4/2018 | Desai | G06V 10/82 |
| 2019/0197357 | A1* | 6/2019 | Anderson | G06N 20/00 |
| 2019/0282155 | A1* | 9/2019 | St Amant | G16H 40/63 |
| 2020/0265745 | A1* | 8/2020 | Buras | A61B 8/461 |
| 2020/0265754 | A1* | 8/2020 | Buras | A61B 8/5292 |
| 2020/0268349 | A1* | 8/2020 | Buras | A61B 8/0891 |
| 2020/0409457 | A1* | 12/2020 | Terrano | G02B 27/017 |
| 2021/0019982 | A1* | 1/2021 | Todd | H04N 21/2343 |
| 2021/0117780 | A1* | 4/2021 | Malik | G06Q 10/109 |
| 2021/0133670 | A1* | 5/2021 | Cella | G06N 3/044 |
| 2021/0182996 | A1* | 6/2021 | Cella | G06Q 10/0631 |
| 2021/0192280 | A1* | 6/2021 | Zhang | G06N 20/20 |
| 2021/0209507 | A1* | 7/2021 | Zafar | A61B 5/7267 |

(Continued)

OTHER PUBLICATIONS

Density Labs Team, "Eliminate Ghost Meetings", density.io, 2023, 6 pages.

(Continued)

*Primary Examiner* — Ibrahim A Khan
(74) *Attorney, Agent, or Firm* — Lando & Anastasi, LLP

(57) ABSTRACT

Techniques are described for training a machine learning model on parameters calculated from usage parameters of a plurality of training instances of a mixed reality graphical environment (MRGE) to determine usage scenarios using a supervisory signal and then using the trained machine learning model to ascertain usage scenarios for non-training instances of the MRGE to determine usage scenarios. The ascertained usage scenarios may then be used to dynamically adjust features of the non-training instances of an MRGE.

20 Claims, 4 Drawing Sheets

(56) References Cited

U.S. PATENT DOCUMENTS

| | | | |
|---|---|---|---|
| 2021/0209854 A1* | 7/2021 | Booth | G06N 20/00 |
| 2021/0223864 A1* | 7/2021 | Forsland | G06F 1/163 |
| 2021/0295048 A1* | 9/2021 | Buras | G06N 20/00 |
| 2021/0406598 A1* | 12/2021 | Yang | G06V 10/751 |
| 2022/0036302 A1* | 2/2022 | Cella | H04L 67/1097 |
| 2022/0187847 A1* | 6/2022 | Cella | G06Q 10/06 |
| 2022/0197306 A1* | 6/2022 | Cella | G06N 20/10 |
| 2022/0198562 A1* | 6/2022 | Cella | G06Q 40/04 |
| 2022/0245574 A1* | 8/2022 | Cella | G06Q 10/087 |
| 2022/0366494 A1* | 11/2022 | Cella | H04L 9/50 |
| 2023/0078448 A1* | 3/2023 | Cella | G06Q 10/06311 705/7.13 |
| 2023/0083724 A1* | 3/2023 | Cella | G06F 16/182 705/28 |
| 2023/0098602 A1* | 3/2023 | Cella | B25J 9/1674 700/248 |
| 2023/0102048 A1* | 3/2023 | Cella | B25J 9/1661 700/248 |
| 2023/0130770 A1* | 4/2023 | Miller | G06N 20/00 345/156 |
| 2023/0173395 A1* | 6/2023 | Cella | G06Q 30/06 463/25 |
| 2023/0206329 A1* | 6/2023 | Cella | G06Q 20/0855 |
| 2023/0214925 A1* | 7/2023 | Cella | G06Q 30/06 705/37 |
| 2023/0222454 A1* | 7/2023 | Cella | G06N 7/01 705/28 |
| 2023/0222531 A1* | 7/2023 | Cella | G06Q 10/0631 705/7.31 |
| 2024/0249205 A1* | 7/2024 | Hatakeyama | G06N 5/01 |
| 2024/0338958 A1* | 10/2024 | Gong | G06V 30/19173 |
| 2025/0054008 A1* | 2/2025 | Cella | G06N 5/043 |

OTHER PUBLICATIONS

"Linear density", Wikipedia, Oct. 2023, 3 pages, <https://en.wikipedia.org/w/index.php?title=Linear_density&oldid=1180357109>.

Andrew, "Another efficient algorithm for convex hulls in two dimensions", Information Processing Letters, Dec. 1979, pp. 216-219, vol. 9, No. 5.

Bellock, "Alpha Shape Toolbox", Apr. 2021, 24 pages, accessed from <https://pypi.org/project/alphashape/> on Jul. 15, 2024.

Breunig et al., "LOF: Identifying Density-Based Local Outliers", SIGMOD '00: Proceedings of the 2000 ACM SIGMOD international conference on Management of data, May 2000, pp. 93-104, vol. 29 Issue 2, ACM, Dallas, TX USA.

Daae et al., "A classification of user research methods for design for sustainable behaviour", Journal of Cleaner Production, May 2014, pp. 680-689, vol. 106, Elsevier Ltd.

Edelsbrunner, et al., "On the shape of a set of points in the plane", IEEE Transactions on Information Theory, Jul. 1983, pp. 551-559, vol. IT-29, No. 4.

\* cited by examiner

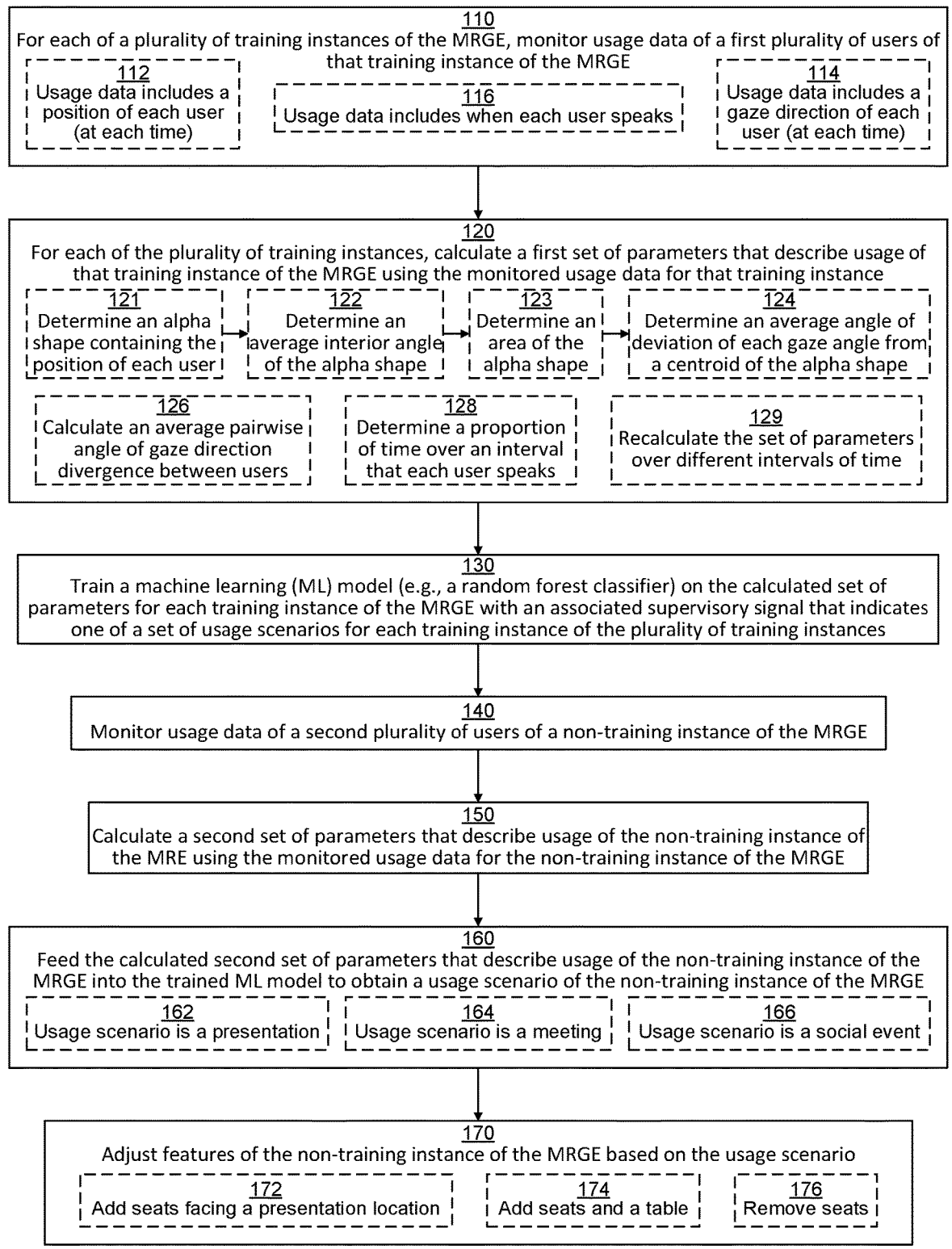

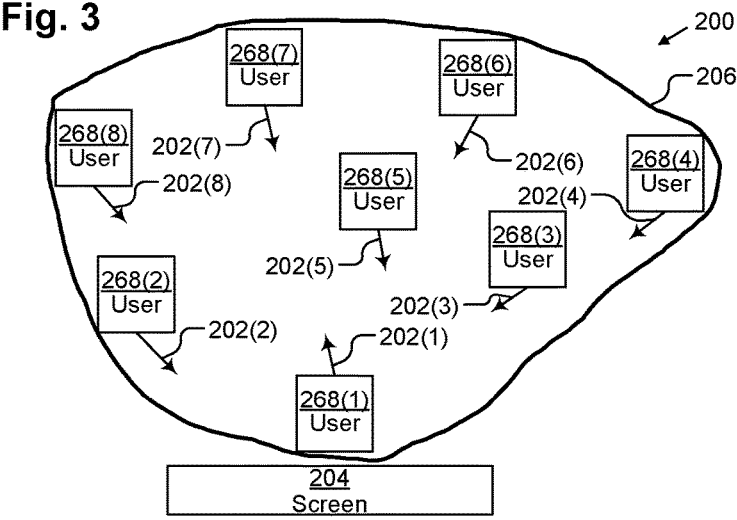
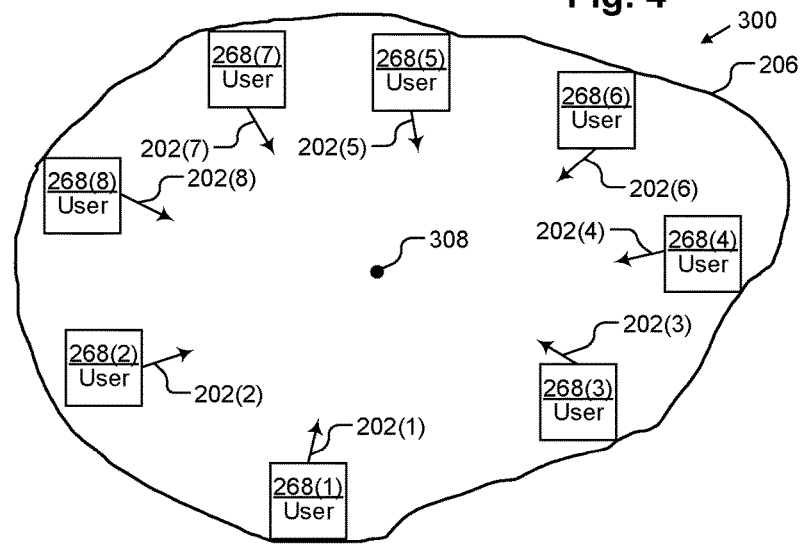
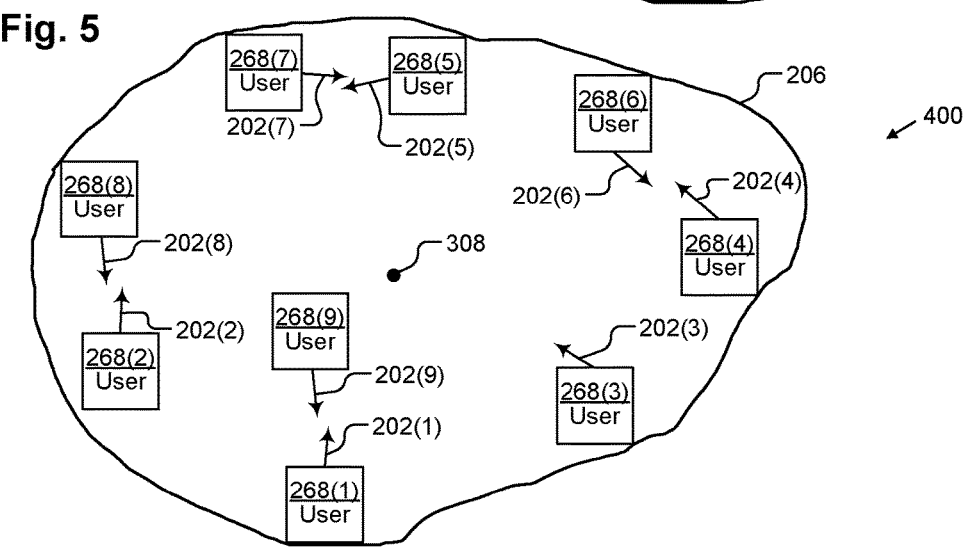

TECHNIQUES FOR ADJUSTING MIXED REALITY GRAPHICAL ENVIRONMENTS USING MACHINE LEARNING

BACKGROUND

Mixed Reality (MR) technology has opened up a new frontier in the design of spaces, transcending the traditional boundaries of the physical world and offering a canvas of virtually limitless possibilities. This technology allows creation of environments that are not only visually stunning but also highly functional, tailored to a wide range of specific purposes and user experiences. MR technology, with its immersive and highly customizable nature, offers an unprecedented opportunity to reshape norms and enhance user experiences. It provides a suite of tools that streamline interaction, facilitate completion of tasks, and create a more engaging and productive environment.

SUMMARY

In one embodiment, a method of operating a mixed reality graphical environment (MRGE) is described. The method may be performed by processing circuitry of one or more computing devices. The method includes (a) for each of a plurality of training instances of the MRGE running on the processing circuitry, monitoring usage data of a first plurality of users of that training instance of the MRGE; (b) for each of the plurality of training instances, calculating a first set of parameters that describe usage of that training instance of the MRGE using the monitored usage data for that training instance; (c) training a machine learning (ML) model on the calculated set of parameters for each training instance of the MRGE with an associated supervisory signal that indicates one of a set of usage scenarios for each training instance of the plurality of training instances; (d) monitoring usage data of a second plurality of users of a non-training instance of the MRGE; (e) calculating a second set of parameters that describe usage of the non-training instance of the MRGE using the monitored usage data for the non-training instance of the MRGE; (f) feeding the calculated second set of parameters that describe usage of the non-training instance of the MRGE into the trained ML model to obtain a usage scenario of the non-training instance of the MRGE; and (g) adjusting features of the non-training instance of the MRGE based on the usage scenario. A system, apparatus, and computer program product for performing this method and similar methods are also described.

BRIEF DESCRIPTION OF THE DRAWINGS

The foregoing and other objects, features, and advantages will be apparent from the following description of particular embodiments, as illustrated in the accompanying drawings in which like reference characters refer to the same parts throughout the different views. The drawings are not necessarily to scale, emphasis instead being placed upon illustrating the principles of various embodiments of the invention.

FIG. 2 illustrates an example method in accordance with one or more embodiments.

FIGS. 3-5 depict different example configurations of an MRGE for use in conjunction with one or more embodiments.

DETAILED DESCRIPTION

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

Unfortunately, understanding and predicting user behavior in MR spaces is a complex task. The immersive nature of MR allows for a broad spectrum of user interactions, from simple gestures to complex navigational behaviors. This wide range of possible interactions can make it difficult to capture and interpret all relevant data. Moreover, the novelty of MR environments means that users are often exploring new ways of interacting, which may not adhere to established norms.

To address these challenges, a machine-learning toolkit designed to estimate and understand user distribution within MR spaces may be used. This toolkit leverages advanced machine learning algorithms to analyze user behavior data and generate insights into how users interact with and utilize these spaces. By analyzing data from an MR platform, it is possible to extract patterns of user behavior and gain valuable insights into how to optimize these spaces for user engagement and productivity.

Figure 1:
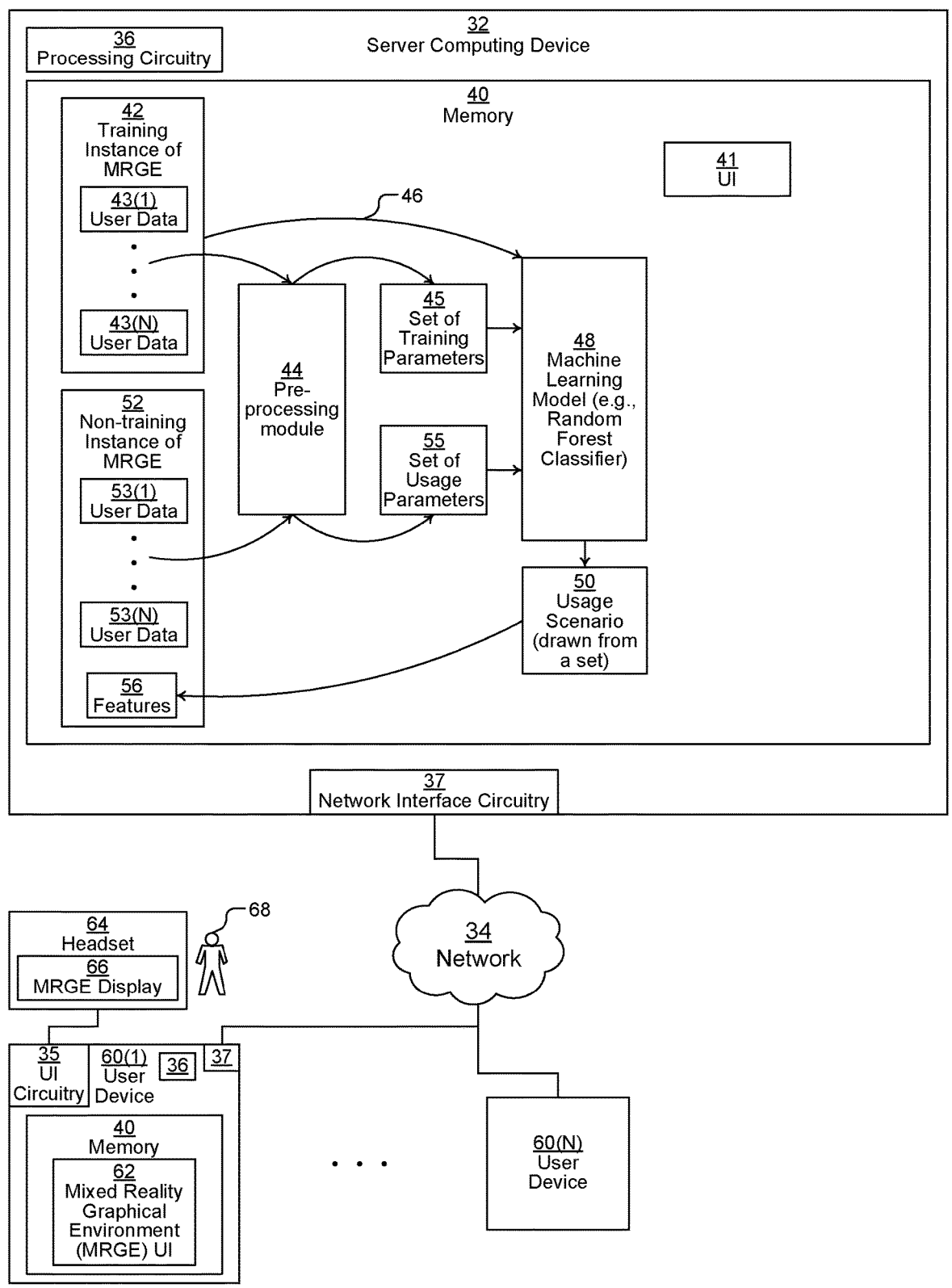
FIG. 1 illustrates an example system, apparatuses, computer program products, and associated data structures for use in connection with one or more embodiments.

FIG. 1 depicts an example system 30 for use in connection with various embodiments. System 30 includes at least one server computing device 32. Server computing device 32 may connect to a network 34 to allow N users 68 to communicate via user devices 60 (depicted as user devices 60(1), . . . , 60(N)). Server computing device 32 may be any kind of computing device, such as, for example, a personal computer, laptop, workstation, server, enterprise server, tablet, smartphone, router, etc.

Network 34 may be any kind of communications network or set of communications networks, such as, for example, a LAN, WAN, SAN, the Internet, a wireless communication network, a virtual network, a fabric of interconnected switches, etc.

Server computing device 32 and each user device 60 includes processing circuitry 36, network interface circuitry 37, and memory 40. Server computing device 32 and the user devices 60 may also include various additional features as is well-known in the art, such as, for example, interconnection traces and buses, etc. Each user device 60 also includes user interface (UI) circuitry 35 for connecting to a headset 64 capable of being worn by a user 68 to allow the user 68 to view and interact with a mixed reality graphical environment (MRGE) managed by the server computing device 32. In some embodiments (not depicted), server computing device 32 may also include UI circuitry 35 to allow one or more users 68 to view and interact with the MRGE using a headset 64 locally.

Processing circuitry 36 may include any kind of processor or set of processors configured to perform operations, such as, for example, a microprocessor, a multi-core microprocessor, a digital signal processor, a field-programmable gate array (FPGA), a system on a chip (SoC), a collection of electronic circuits, a similar kind of controller, or any combination of the above.

Network interface circuitry 37 may include one or more Ethernet cards, cellular modems, Fibre Channel (FC) adapters, InfiniBand adapters, wireless networking adapters (e.g., Wi-Fi), and/or other devices for connecting to network 34.

UI circuitry 35 may include any circuitry needed to communicate with and connect to headset 64. Headset 64 may be a virtual reality headset having a display 66 configured to display the MRGE to the user 68. Display 66 may be mounted as one or two display screens (e.g., LED or LCD displays) mounted within 4 inches of the eyes of the user 68 while the user 68 wears the headset on his/her head. In some embodiments, headset 64 may include an accelerometer or other devices (not depicted) to determine a direction in which the user's head is facing. In some embodiments, headset 64 may include an eye-tracking device (not depicted) to determine a direction in which the user's eyes are pointing. Headset 64 may also include speakers (e.g., earpieces) and a microphone (not depicted) to allow the user to interact with the MRGE using sound. In some embodiments, UI circuitry 35 may also connect to other virtual reality devices, such as haptic gloves (not depicted). In some embodiments, UI circuitry 35 may also connect to other user input devices (e.g., a keyboard, keypad, mouse, trackpad, trackball, pointing stick, joystick, microphone, etc.), displays (e.g., a CRT, LCD screen, LED screen, etc.), printers, and/or speakers (not depicted). UI circuitry 35 may include, for example, a virtual reality display controller, keyboard controller, mouse controller, touch controller, haptic glove controller, serial bus port and controller, universal serial bus (USB) port and controller, wireless controller and antenna (e.g., Bluetooth), graphics adapter and port, etc.

Memory 40 may include any kind of digital system memory, such as, for example, random access memory (RAM). Memory 40 stores an operating system (OS, not depicted, e.g., a Linux, UNIX, Windows, MacOS, or similar operating system) and various drivers and other applications and software modules configured to execute on processing circuitry 36 as well as various data.

Memory 40 of user devices 60 stores an MRGE UI 62 configured to interact with the user 68 via the MRGE display 66 and possibly other UI devices and to communicate with server computing device 32 to allow the user 68 to view and interact with the MRGE managed by the server computing device 32.

Memory 40 of server computing device 32 stores a UI 41 configured to interact with a user 68 via the UI circuitry 35 (e.g., across network 34). Memory 40 of server computing device 32 also stores one or more training instances 42 of the MRGE, a non-training instance 52 of the MRGE, a pre-processing module 44, a set of training parameters 45, a set of usage parameters 55, and a machine learning model (MLM) 48. MLM 48 may be any kind of machine learning model, such as, for example, a random forest classifier, a neural network, etc.

In operation, N users 68 initially interact with a training instance 42 of the MRGE. Thus, each user may virtually wander about through the training instance 42 of the MRGE, looking at different objects or in different directions over time, speaking as appropriate, etc. Usage data 43 is recorded for each user 68 (depicted as usage data 43(1), . . . , 43(N)) during interaction with the training instance 42 of the MRGE. Usage data 43 may include, for example, a location and gaze direction (what direction that user's eyes are looking at, e.g., measured as an angle from a reference direction, such as north) at various points of time (e.g., every 1, 5, or 10 seconds, every time the user 68 changes position or direction of gaze, etc.), and information about when the user 68 has spoken. Usage data 43 is fed into pre-processing module 44, which is configured to extract a set 45 of training parameters from the usage data 43.

The set 45 of training parameters may include, for example, parameters of an alpha shape surrounding all users 68 at any given time. An "alpha shape" denotes a computational methodology for delineating the geometric boundary of a discrete set of points within a Euclidean space, characterized by the parameter $\alpha$ (alpha), a real (typically, but not necessarily non-negative) scalar value that governs the granularity of the resultant shape. This methodology employs a selective filtration process on the Delaunay triangulation of the input point set, whereby simplices (comprising edges in two-dimensional space, triangles in three-dimensional space, etc.) are conditionally included based on the criterion that their circumradius does not exceed the threshold determined by $1/\alpha$. The aggregation of these conditionally selected simplices forms an "alpha complex", the outer boundary of which is defined as the alpha shape. This boundary serves as a versatile representation of the set's inherent geometric structure, enabling the creation of shapes that range from minimally connected graphs to fully enclosed hulls, contingent upon the specified value of a. Various values of a may be used, but in one example embodiment, a may range between 0.1 and 0.4, while in another example embodiment, a may range between 0.01 and 1. The parameters of the alpha shape may include, for example, the value of a used and the borders, centroid, area, and/or average interior angle, etc., of the alpha shape. The set 45 of training parameters may also include, for example, an average angle of deviation of each user's gaze from the centroid of the alpha shape at any given time, an average pairwise angle of gaze direction divergence between users 68 at any given time, etc.

The set 45 of training parameters may be fed into the MLM 48 together with a supervisory signal 46. Supervisory signal 46 indicates which usage scenario 50 drawn from a set of potential usage scenarios a supervisor believes the training instance 42 of the MRGE is currently in at any given time. In an example embodiment, the set of potential usage scenarios may include: (a) a presentation usage scenario, (b)

a meeting usage scenario, (c) a social event usage scenario, and (d) an unclassified (other) usage scenario. The MLM 48 may be trained to yield the same output usage scenario 50 as indicated by the supervisory signal 46 over a plurality of different training instances 42 of the MRGE until the accuracy of the MLM 48 is deemed sufficient by the supervisor.

Once the MLM 48 has been trained, it may be used in conjunction with a non-training instance 52 of the MRGE. N users 68 may interact with the non-training instance 52 of the MRGE, with usage data 53 (depicted as usage data 5(1), . . . , 53(N)) (similar to usage data 43) recorded for each user 68. As the non-training instance 52 of the MRGE operates, usage data 53 is fed into the pre-processing module 44, which is again configured to extract a set 55 of usage parameters from the usage data 53. This set 55 of usage parameters may be periodically (e.g., every 30 seconds) fed into the MLM 48 to yield a current usage scenario 50 of the non-training instance 52 of the MRGE. This current usage scenario 50 of the non-training instance 52 of the MRGE may be fed back into the non-training instance 52 of the MRGE, allowing features 56 of the non-training instance 52 of the MRGE to be adjusted on the fly. For example, a number of seats in the non-training instance 52 of the MRGE may be adjusted depending on the usage scenario 50 as well as the number, N, of users 68.

Memory 40 may also store various other data structures used by the OS, modules 41, 42, 52, 44, 48, 62, and/or various other applications and drivers. In some embodiments, memory 40 may also include a persistent storage portion. The persistent storage portion of memory 40 may be made up of one or more persistent storage devices, such as, for example, magnetic disks, flash drives, solid-state storage drives, or other types of storage drives. The persistent storage portion of memory 40 is configured to store programs and data even while the server computing device 32 or user device 60 is powered off. The OS, modules 41, 42, 52, 44, 48, 62 and/or various other applications and drivers are typically stored in this persistent storage portion of memory 40 so that they may be loaded into a system portion of memory 40 upon a system restart or as needed. The OS, modules 41, 42, 52, 44, 48, 62 and/or various other applications and drivers, when stored in non-transitory form either in the volatile or persistent portion of memory 40, each form a computer program product. The processing circuitry 36 running one or more applications thus forms a specialized circuit constructed and arranged to carry out the various processes described herein.

FIG. 2 illustrates an example method 100 performed by server computing device 32 for operating an MRGE. It should be understood that any time a piece of software (e.g., OS, modules 41, 42, 52, 44, 48, 62, etc.) is described as performing a method, process, step, or function, what is meant is that a computing device (e.g., server computing device 32, user device 60, etc.) on which that piece of software is running performs that method, process, step, or function when executing that piece of software on its processing circuitry 36. It should be understood that one or more of the steps or sub-steps of method 100 (especially steps indicated by dashed lines) may be omitted in some embodiments. Similarly, in some embodiments, one or more steps or sub-steps may be combined together or performed in a different order.

In step 110, for each of a plurality of training instances 42 of an MRGE, server computing device 32 monitors usage data 43 of a first plurality of users 68 of that training instance 42 of the MRGE. In order to properly train the MLM 48, this step (as well as steps 120, 130) should be performed repeatedly on many different training instances 42 of the MRGE (e.g., 100 times) in real-world usage.

In some embodiments (sub-step 112), the usage data 43 includes, for each user 68, a position of that user 68 at various points in time of that user 68 using the training instance 42 of the MRGE (e.g., every time the user 68 moves a new position and time is recorded; the position of the user 68 is recorded at fixed intervals, such as every 1, 5, or 10 seconds, etc.). In some embodiments (sub-step 114), the usage data 43 includes, for each user 68, a gaze direction of that user 68 at various points in time of that user 68 using the training instance 42 of the MRGE (e.g., every time the user 68 moves a new position and time is recorded; the position of the user 68 is recorded at fixed intervals, such as every 1, 5, or 10 seconds, etc.). The gaze direction is the angle offset from a fixed reference direction (e.g., due north) in which the user's eyes are pointing.

For example, with reference to the arrangement 200 of FIG. 3, users 268(1)-268(8) are located at various positions as shown, and each user 268 has a respective gaze direction 202 (depicted as gaze directions 202(1), 202(2), . . . , 202(8)). As depicted in FIG. 3, the gaze directions 202(2)-202(8) and positions indicate that users 268(2)-268(8) are generally facing the direction of a screen 204 placed immediately behind user 268(1). As indicated by gaze direction 202(1), user 268(1) is facing away from the screen 204 and generally towards the crowd of users 268(2)-268(8).

As another example, with reference to the arrangement 300 of FIG. 4, users 268(1)-268(8) are located at positions as shown, and each user 268 has a respective gaze direction 202. As depicted in FIG. 4, the gaze directions 202(1)-202(8) and positions indicate that users 268(1)-268(8) are generally facing inwards towards each other. As another example, with reference to the arrangement 400 of FIG. 5, users 268(1)-268(9) are located at positions as shown, and each user 268 has a respective gaze direction 202. As depicted in FIG. 5, the gaze directions 202(1)-202(9) and positions indicate that users 268(1), 268(9) are roughly facing each other, users 268(2), 268(8) are also roughly facing each other, users 268(5), 268(7) are also roughly facing each other, users 268(4), 268(6) are also roughly facing each other, and user 268(3) is generally facing the crowd of other users 268.

In some embodiments (sub-step 116), the usage data 43 includes, for each user 68, information indicating when each user 68 is speaking. For example, time may be divided into consecutive speaking intervals (e.g., 1, 5, or 10 seconds long), and for each user 268(X), it is recorded whether or not that user 268(X) spoke at all during that speaking interval.

In step 120, for each of the plurality of training instances 42 of the MRGE, pre-processing module 44 calculates a first set 45 of parameters (i.e., training parameters) that describe the usage of that training instance 42 of the MRGE, using the monitored usage data 43 for that training instance 42 of the MRGE. In some embodiments, step 120 includes sub-step 121 and one or more of sub-steps 122-124. In sub-step 121, pre-processing module 44 calculates an alpha shape containing the position of each user 68 at a given time (e.g., using the positions recorded in sub-step 112, performed separately for positions at different times). For example, with reference to FIGS. 3-5, alpha shapes 206 around the positions of the users 268 is depicted. In sub-step 122, pre-processing module 44 determines an average interior angle of the alpha shape at a given time. In sub-step 123, pre-processing module 44 determines the area of the alpha shape at a given time. In sub-step 124, pre-processing module 44 determines an average angle of deviation of each gaze angle 202 from a centroid 308 of the alpha shape. For example, with reference to FIG. 4, since most of the users 268 are generally facing towards the centroid 308, the average angle of deviation will be rather small (e.g., 5 degrees), but with reference to FIG. 5, since most of the users 268 are generally not facing towards the centroid 308, the average angle of deviation will be rather large (e.g., 150 degrees).

In some embodiments, step 120 includes one or more of sub-steps 126, 128, 129.

In sub-step 126, pre-processing module 44 determines an average pairwise angle of gaze angle 202 divergence for all users 268. For example, with reference to FIG. 5, since users 268(1), 268(9) are roughly facing each other, the pairwise gaze angle 202 divergence for users 268(1), 268(9) will be rather small. Similarly, the pairwise gaze angle 202 divergence for users 268(2), 268(8), for users 268(5), 268(7), and for users 268(4), 268(6) will also be rather small (e.g., less than 30 degrees), while the pairwise gaze angle 202 divergence for other pairs of users 268 will generally be rather large (e.g., more than 30 degrees). Even if a pair of users 268(X), 268(Y) who are conversing with each other momentarily glance away from each other, the pairwise gaze angle 202 divergence for that pair of users 268(X), 268(Y) will generally fluctuate around a small value (e.g., less than 30 degrees) for the entire length of their conversation. Similarly, even if a user 268(X) happens to momentarily glance at another user 268(Y) that s/he is not conversing with, the other user 2568(Y) will most likely not be glancing at user 268(X) at the exact same moment (and even if so, only momentarily), so the pairwise gaze angle 202 divergence for users 268(X), 268(Y) who are not engaged in conversation will likely fluctuate around a large value (e.g., more than 30 degrees). As another example, with reference to FIG. 4, since this arrangement represents a meeting, the pairwise gaze angle 202 divergence for all of users 268(1)-268(8) will generally fluctuate around a large value (e.g., more than 30 degrees) over the course of the meeting, even if it occasionally drops for a particular pair of users 268(X), 268(Y) who happen to momentarily glance at each other during the meeting.

In sub-step 128, pre-processing module 44 determines a proportion of time over an interval that each user 68, 268 speaks. For example, if the usage data 43 indicates when a particular user 268(X) spoke, in step 128, pre-processing module 44 may calculate a speaking proportion over an interval (e.g., 30 seconds, 1 minute, 5 minutes, 10 minutes, etc.) by dividing the amount of time during the interval during which that user 268(X) spoke by the length of the interval. For example, with reference to arrangement 200 of FIG. 3, user 268(1) appears to be giving a presentation. Thus, it is likely that over the course of 5 minutes, the speaking proportion for user 268(1) will exceed 75%. If, however, the speaking proportion for user 268(1) in the arrangement 200 of FIG. 3 is less than 10%, it is likely that user 268(1) is not, in fact, giving a presentation at all, but rather is introducing a movie or moderating a discussion. Similarly, it is likely that over the course of 10 minutes, the speaking proportion for each of the users 268(2)-268(8) in the audience is less than 15% (e.g., a user 268(Y) in the audience may speak for a short time while asking a question or making a comment). As another example, with reference to arrangement 300 of FIG. 4, users 268(1)-268(8) appear to be attending a group meeting, so it is likely that each user 268(1)-268(8) will have a roughly equal speaking proportion, with some deviation to account for the fact that some people tend to speak more at meetings than others. As another example, with reference to arrangement 400 of FIG. 5, this appears to be a social gathering at which pairs of users 268 are engaged in private conversations, so it is likely that each user 258 engaged in a conversation (i.e., all users 268 except for user 268(3)) has a speaking proportion close to 50% (e.g., within a range of 40-60%).

In sub-step 128, pre-processing module 44 performs and records the calculation of the first set 45 of parameters repeatedly over successive intervals (e.g., non-overlapping 2-minute intervals).

In step 130, server computing device 32 trains MLM 48 on the calculated first set 45 of parameters for each training instance 42 of the MRGE (e.g., for 100 separate training instances 42) with an associated supervisory signal 46 that indicates a particular usage scenario 50 for each training instance 42. In some embodiments, the supervisory signal 46 for a particular training instance 42 may have multiple usage scenarios 50 if the usage changes over the course of that training instance 42. After a sufficient number of training instances, MLM 48 should be able to accurately determine the correct usage scenario 50 for any subsequent non-training instance 52 of the MRGE.

In step 140, server computing device 32 monitors usage data 53 of a second plurality of users 68 of a non-training instance 52 of the MRGE. Usage data 53 has a similar structure as usage data 43. Step 140 may also include sub-steps (not depicted) similar to one or more of sub-steps 112, 114, 116.

In step 150, pre-processing module 44 calculates a second set 55 of parameters (i.e., usage parameters) that describe the usage of the non-training instance 52 of the MRGE, using the monitored usage data 53 for the non-training instance 52 of the MRGE. The second set 55 of parameters has a similar structure as the first set 45 of parameters. Step 150 may also include sub-steps (not depicted) similar to one or more of sub-steps 121-129.

In step 160, server computing device 32 feeds the calculated second set 55 of parameters for the non-training instance 52 of the MRGE into MLM 48 to obtain a usage scenario 50 of the non-training instance 52 of the MRGE. In some embodiments, step 160 may be repeated several times (e.g., every 30 seconds, 1 minute, 5 minutes, 10 minutes, etc.) as the non-training instance 52 of the MRGE continues to run, allowing for an updated usage scenario 50 to be determined as time passes. The usage scenario 50 may include a presentation usage scenario (sub-step 162), a meeting usage scenario (sub-step 164), or a social event usage scenario (sub-step 166).

In an embodiment, a presentation usage scenario 50 may be determined (sub-step 162) when the pairwise gaze angle 202 divergence for most users 68, 268 is large, most users 68, 268 are facing a common direction or person (e.g., presenting user 268(1)) or object (e.g., screen 204), and a single user (e.g., presenting user 268(1)) has a high speaking proportion. These values are not given specific thresholds because the MLM 48 may rely on different combinations of these factors in combination.

In an embodiment, a meeting usage scenario 50 may be determined (sub-step 164) when the pairwise gaze angle 202 divergence for most users 68, 268 is large, most users 68, 268 are generally facing a towards a centroid location 308, all or many users 68, 268 have similar speaking proportions. Again, these values are not given specific thresholds because the MLM 48 may rely on different combinations of these factors in combination.

In an embodiment, a social event usage scenario 50 may be determined (sub-step 166) when the pairwise gaze angle 202 divergence for many pairs of nearby users 68, 268 is small, most users 68, 268 are not generally facing a towards a centroid location 308, and most users 68, 268 have speaking proportions with a range around 50%. Again, these values are not given specific thresholds because the MLM 48 may rely on different combinations of these factors in combination.

In other embodiments, there may be additional possible usage scenarios 50, such as, for example, an unclassified (other) usage scenario, a movie usage scenario, or one of several mixed usage scenarios (i.e., there may be different usage scenarios 50 simultaneously in different locations within the non-training instance 52 of the MRGE).

Finally, in step 170, the usage scenario 50 obtained from MLM 48 in step 160 is used used to adjust one or more features 56 of the non-training instance 52 of the MRGE. For example, in sub-step 172, in response to a determination of a presentation usage scenario 50 (see sub-step 162), server computing device 32 may add seats that face a presentation location (e.g., facing screen 204). It should be understood that step 170 may take additional factors into account aside from just the usage scenario, such as, for example, the number of users 268 currently using the non-training instance 52 of the MRGE, a number and orientation of chairs already present within the non-training instance 52 of the MRGE, etc.

As another example, in sub-step 174, in response to a determination of a meeting usage scenario 50 (see sub-step 164), server computing device 32 may add a table and additional seats around the table that face the centroid location 308. As another example, in sub-step 176, in response to a determination of a social event usage scenario 50 (see sub-step 166), server computing device 32 may remove seats and/or tables from the non-training instance 52 of the MRGE.

Figure 6:
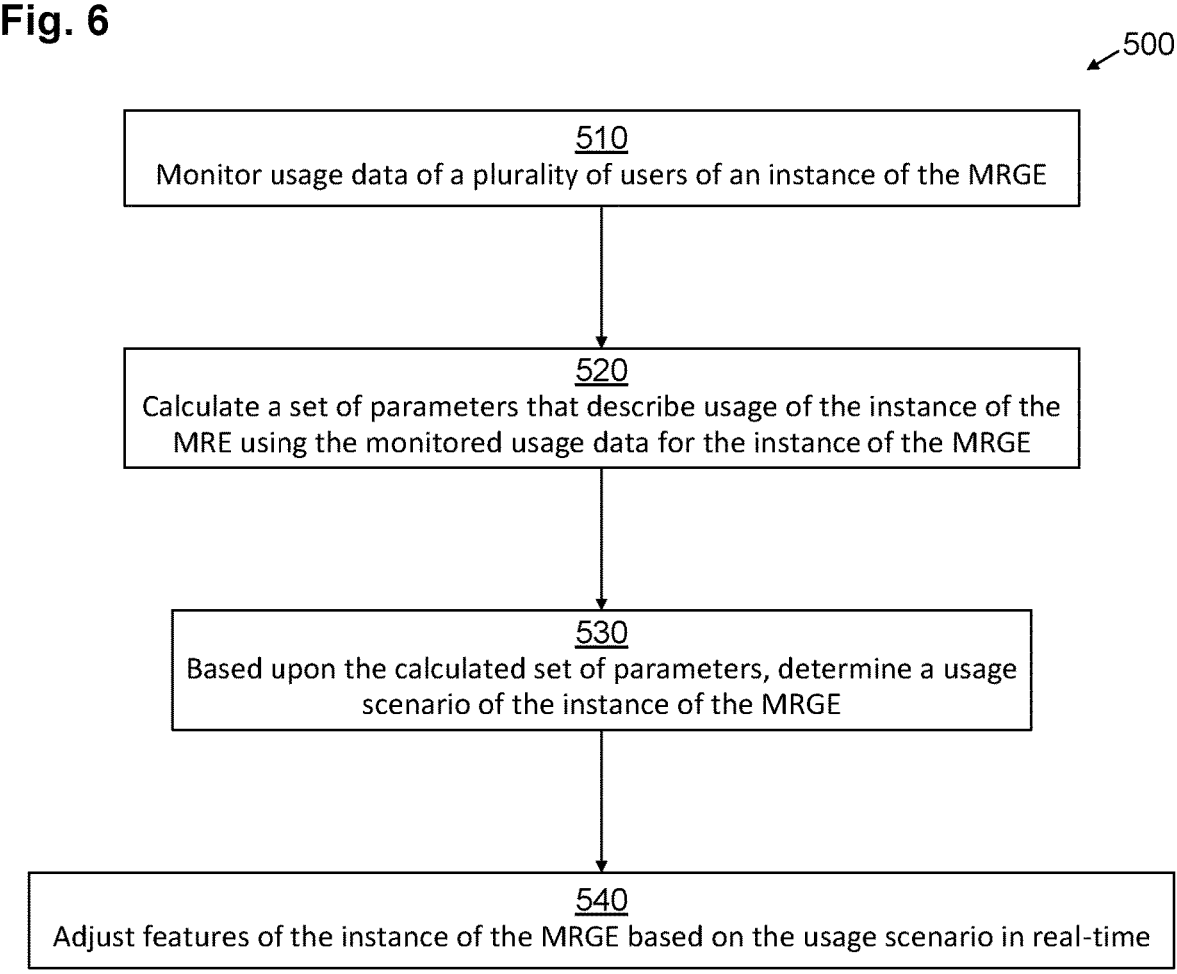
FIG. 6 illustrates an example method in accordance with one or more embodiments.

In some embodiments, a method 500, as depicted in FIG. 6, may be used. In step 510, server computing device 32 monitors usage data 53 of a plurality of users 68, 268 of a non-training instance 52 of an MRGE. In step 520, pre-processing module 44 calculates a set 55 of usage parameters that describe usage of the non-training instance 52 of the MRGE.

In step 530, server computing device 32 determines a usage scenario 50 of the non-training instance 52 of the MRGE based on the calculated set 55 of usage parameters. In some embodiments, step 530 may solely use MLM 48. In other embodiments, step 530 may use the output of MLM 48 but also perform additional operations to determine the usage scenario 50. In yet other embodiments, step 530 may entirely omit usage of MLM 48, strictly performing other operations to determine the usage scenario 50. For example, in one embodiment, after MLM 48 determines a presentation usage scenario 48, server computing device 32 may refine the usage scenario to determine that it represents a teacher presenting a lesson to a classroom full of schoolchildren in response to determining that features 56 indicate the presence of school desks, a blackboard or whiteboard, etc. As another example, in another embodiment, after MLM 48 determines a presentation usage scenario 48, server computing device 32 may refine the usage scenario to determine that it represents a medical instructor supervising a room full of medical students performing training procedures on models of human bodies in response to determining that features 56 indicate the presence of virtual humans or cadavers and that some of the users 68, 268 are engaged in very precise operations with their hands in the vicinity of the virtual humans or cadavers. As another example, even without using MLM 48, server computing device 32 may determine that users 68, 268 are engaged in a game based on patterns of movement associated with particular games (e.g., baseball, football, scavenger hunts, etc.).

In step 540, server computing device 32 adjusts features 56 of the non-training instance 52 of the MRGE in real-time based on the usage scenario 50 and related determinations from step 530. For example, in response to a determination from step 530 that the usage scenario 48 represents a teacher presenting a lesson to a classroom full of schoolchildren, server computing device 32 may place engaging learning materials in proximity to the students and/or create several smaller discussion rooms off of a main classroom to enable students to engage in small group discussions. In addition, server computing device 32 may additionally determine which students are most engaged with the lesson using various metrics such as gaze direction 202, blink rate, speaking proportion, etc., to inform the teacher which students may require additional help.

As another example, in response to a determination from step 530 that the usage scenario 48 represents a medical instructor supervising a room full of medical students performing training procedures, server computing device 32 may place training materials next to each medical student with instructions for performing various medical procedures. As another example, in response to determining that the usage scenario 48 represents spectators playing different games in different locations and also determining that certain games are not being utilized while other games are constantly being utilized with long lines of users 68, 268 waiting for those games, server computing device 32 may remove the underutilized games and replace them with additional instances of the popular games.

While various embodiments of the invention have been particularly shown and described, it will be understood by those skilled in the art that various changes in form and details may be made therein without departing from the spirit and scope of the invention as defined by the appended claims.

It should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments. Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "background" or as "conventional," Applicant makes no admission that such technique, method, apparatus, or other concept is actually prior art under 35 U.S.C. § 102 or 103, such determination being a legal determination that depends upon many factors, not all of which are known to Applicant at this time.

What is claimed is:

1. A method, performed by processing circuitry of one or more computing devices, of operating a mixed reality graphical environment (MRGE), the method comprising:

for each of a plurality of training instances of the MRGE running on the processing circuitry, monitoring usage data of a first plurality of users of that training instance of the MRGE;

for each of the plurality of training instances, calculating a first set of parameters that describe usage of that training instance of the MRGE using the monitored usage data for that training instance;

training a machine learning (ML) model on the calculated set of parameters for each training instance of the MRGE with an associated supervisory signal that indicates one of a set of usage scenarios for each training instance of the plurality of training instances;

monitoring usage data of a second plurality of users of a non-training instance of the MRGE;

calculating a second set of parameters that describe usage of the non-training instance of the MRGE using the monitored usage data for the non-training instance of the MRGE;

feeding the calculated second set of parameters that describe usage of the non-training instance of the MRGE into the trained ML model to obtain a usage scenario of the non-training instance of the MRGE; and adjusting features of the non-training instance of the MRGE based on the usage scenario.

2. The method of claim 1 wherein:
the usage data includes a position of each user while using an instance of the MRGE; and
calculating a set of parameters that describe usage of the instance of the MRGE includes determining an alpha shape containing the position of each user.

3. The method of claim 2 wherein:
the usage data further includes a gaze direction of each user while using the instance of the MRGE; and
calculating the set of parameters that describe usage of the instance of the MRGE further includes determining an average angle of deviation of each gaze angle from a centroid of the alpha shape.

4. The method of claim 1 wherein:
the usage data includes a position and a gaze direction of each user while using an instance of the MRGE; and
calculating a set of parameters that describe usage of the instance of the MRGE includes calculating an average pairwise angle of gaze direction divergence between users.

5. The method of claim 1 wherein:
the usage data includes when each user speaks while using an instance of the MRGE; and
calculating a set of parameters that describe usage of the instance of the MRGE includes determining a proportion of time over an interval that each user speaks.

6. The method of claim 1 wherein calculating a set of parameters that describe usage of an instance of the MRGE includes recalculating the set of parameters over different intervals of time.

7. The method of claim 1 wherein the set of usage scenarios includes:
a presentation usage scenario;
a meeting usage scenario; and
a social event usage scenario.

8. The method of claim 7 wherein:
obtaining the usage scenario of the non-training instance of the MRGE includes receiving an indication from the trained ML model that the usage scenario of the non-training instance of the MRGE is a presentation; and adjusting features of the non-training instance of the MRGE based on the usage scenario includes adding seats to the non-training instance of the MRGE facing a presentation location.

9. The method of claim 7 wherein:
obtaining the usage scenario of the non-training instance of the MRGE includes receiving an indication from the trained ML model that the usage scenario of the non-training instance of the MRGE is a meeting; and
adjusting features of the non-training instance of the MRGE based on the usage scenario includes adding seats and a table to the non-training instance of the MRGE.

10. The method of claim 7 wherein:
obtaining the usage scenario of the non-training instance of the MRGE includes receiving an indication from the trained ML model that the usage scenario of the non-training instance of the MRGE is a social event; and
adjusting features of the non-training instance of the MRGE based on the usage scenario includes removing seats from the non-training instance of the MRGE.

11. The method of claim 1 wherein the ML model is a random forest classifier.

12. A computer program product comprising a non-transitory computer-readable storage medium storing instructions, which, when performed by processing circuitry of a computing system, cause the computing system to:
for each of a plurality of training instances of a mixed reality graphical environment (MRGE) running on the processing circuitry, monitor usage data of a first plurality of users of that training instance of the MRGE;
for each of the plurality of training instances, calculate a first set of parameters that describe usage of that training instance of the MRGE using the monitored usage data for that training instance;
train a machine learning (ML) model on the calculated set of parameters for each training instance of the MRGE with an associated supervisory signal that indicates one of a set of usage scenarios for each training instance of the plurality of training instances;
monitor usage data of a second plurality of users of a non-training instance of the MRGE;
calculate a second set of parameters that describe usage of the non-training instance of the MRGE using the monitored usage data for the non-training instance of the MRGE;
feed the calculated second set of parameters that describe usage of the non-training instance of the MRGE into the trained ML model to obtain a usage scenario of the non-training instance of the MRGE; and
adjust features of the non-training instance of the MRGE based on the usage scenario.

13. The computer program product of claim 12 wherein:
the usage data includes a position of each user while using an instance of the MRGE; and
calculating a set of parameters that describe usage of the instance of the MRGE includes determining an alpha shape containing the position of each user.

14. The computer program product of claim 13 wherein:
the usage data further includes a gaze direction of each user while using the instance of the MRGE; and
calculating the set of parameters that describe usage of the instance of the MRGE further includes determining an average angle of deviation of each gaze angle from a centroid of the alpha shape.

15. The computer program product of claim 12 wherein:
the usage data includes a position and a gaze direction of each user while using an instance of the MRGE; and
calculating a set of parameters that describe usage of the instance of the MRGE includes calculating an average pairwise angle of gaze direction divergence between users.

16. The computer program product of claim 12 wherein:
the usage data includes when each user speaks while using an instance of the MRGE; and
calculating a set of parameters that describe usage of the instance of the MRGE includes determining a proportion of time over an interval that each user speaks.

17. The computer program product of claim 12 wherein calculating a set of parameters that describe usage of an instance of the MRGE includes recalculating the set of parameters over different intervals of time.

18. The computer program product of claim 12 wherein the set of usage scenarios includes:
   a presentation usage scenario;
   a meeting usage scenario; and
   a social event usage scenario.

19. A system comprising one or more computing devices including processing circuitry and memory configured to cause the computing system to:
   for each of a plurality of training instances of a mixed reality graphical environment (MRGE) running on the processing circuitry, monitor usage data of a first plurality of users of that training instance of the MRGE;
   for each of the plurality of training instances, calculate a first set of parameters that describe usage of that training instance of the MRGE using the monitored usage data for that training instance;
   train a machine learning (ML) model on the calculated set of parameters for each training instance of the MRGE with an associated supervisory signal that indicates one of a set of usage scenarios for each training instance of the plurality of training instances;
   monitor usage data of a second plurality of users of a non-training instance of the MRGE;
   calculate a second set of parameters that describe usage of the non-training instance of the MRGE using the monitored usage data for the non-training instance of the MRGE;
   feed the calculated second set of parameters that describe usage of the non-training instance of the MRGE into the trained ML model to obtain a usage scenario of the non-training instance of the MRGE; and
   adjust features of the non-training instance of the MRGE based on the usage scenario.

20. The system of claim 19 wherein:
the usage data includes a position of each user while using an instance of the MRGE; and
calculating a set of parameters that describe usage of the instance of the MRGE includes determining an alpha shape containing the position of each user.

* * * * *